United States Patent [19]
Dion et al.

[11] Patent Number: 5,955,540
[45] Date of Patent: Sep. 21, 1999

[54] PROCESS FOR THE PREPARATION OF MULTIMODAL ABS POLYMERS

[75] Inventors: Robert P. Dion; David W. Mitchell; Patricia B. Leng, all of Midland, Mich.

[73] Assignee: The Dow Chemical Company, Midland, Mich.

[21] Appl. No.: 09/048,767

[22] Filed: Mar. 26, 1998

Related U.S. Application Data

[63] Continuation of application No. 08/679,548, Jul. 12, 1996, abandoned, which is a continuation of application No. 08/200,116, Feb. 22, 1994, abandoned.

[51] Int. Cl.$^6$ .................................................. C08L 51/04
[52] U.S. Cl. ............................... 525/71; 525/80; 525/316
[58] Field of Search ......................... 525/71, 316, 80

[56] References Cited

U.S. PATENT DOCUMENTS

| | | | |
|---|---|---|---|
| 3,170,964 | 2/1965 | Grabowski | 525/71 |
| 3,442,979 | 5/1969 | Ott et al. | 525/316 |
| 3,509,237 | 4/1970 | Aubrey | 525/71 |
| 3,576,910 | 4/1971 | Jastrzebski | 525/71 |
| 3,600,465 | 8/1971 | Kanpp et al. | 525/86 |
| 3,652,721 | 3/1972 | Dalton et al. | 525/71 |
| 3,833,532 | 9/1974 | Bennett et al. | 524/747 |
| 3,928,494 | 12/1975 | Aliberti | 525/71 |
| 4,009,226 | 2/1977 | Ott et al. | 525/71 |
| 4,009,227 | 2/1977 | Ott et al. | 525/71 |
| 4,104,328 | 8/1978 | Swoboda et al. | 525/78 |
| 4,357,270 | 11/1982 | Pippa et al. | 523/335 |
| 4,419,496 | 12/1983 | Henton et al. | 525/301 |
| 4,430,478 | 2/1984 | Schmitt et al. | 525/71 |
| 4,487,890 | 12/1984 | Kishida et al. | 525/193 |
| 4,510,287 | 4/1985 | Wu | 525/84 |
| 4,520,165 | 5/1985 | Zabrocki et al. | 525/84 |
| 4,559,386 | 12/1985 | Wu | 525/71 |
| 4,713,420 | 12/1987 | Henton | 525/236 |
| 4,767,833 | 8/1988 | Yumoto et al. | 525/193 |
| 5,008,331 | 4/1991 | Kawashima et al. | 525/84 |
| 5,270,387 | 12/1993 | Shields et al. | 525/71 |

FOREIGN PATENT DOCUMENTS

| | | |
|---|---|---|
| 433715 | 12/1989 | European Pat. Off. . |
| 3629 152 A1 | 3/1988 | Germany . |
| 50-128744 | 10/1975 | Japan . |
| 53-057293 | 5/1978 | Japan . |
| 54-064583 | 5/1979 | Japan . |
| 55-025428 | 2/1980 | Japan . |
| 57-023652 | 2/1982 | Japan . |
| 58-017144 | 2/1983 | Japan . |
| 62-011713 | 1/1987 | Japan . |
| 62-167348 | 7/1987 | Japan . |
| 2194949 | 9/1986 | United Kingdom . |
| 9113-118 | 9/1991 | WIPO . |

*Primary Examiner*—Mark Warzel
*Attorney, Agent, or Firm*—Tai-Sam Choo

[57] ABSTRACT

Rubber-modified monovinylidene aromatic copolymers having an enhanced combination of gloss, toughness and melt flow characteristics are provided by a process wherein a rubber latex having a specified particle size is partially agglomerated, emulsion graft polymerized to a specified graft copolymer to rubber (G/R) ratio and a specified graft copolymer molecular weight and further agglomerated during subsequent dewatering and/or melt compounding operations.

11 Claims, No Drawings

PROCESS FOR THE PREPARATION OF MULTIMODAL ABS POLYMERS

CROSS-REFERENCE TO RELATED APPLICATION

This application is a Continuation of application Ser. No. 08/679,548, filed on Jul. 12, 1996, now abandoned, which is a Continuation of the application Ser. No. 08/200,116, filed Feb. 22, 1994, which application is now abandoned.

BACKGROUND OF THE INVENTION

This invention pertains to methodology for preparing rubber-modified monovinylidene aromatic copolymers of the sort which are commonly referred to in the art as ABS resins. In particular, it pertains to a subcategory of such resins wherein the grafted rubber particles dispersed therein exhibit a particle size distribution which is multimodal in character (i.e., having 2 or more distinct peaks in the particle size distribution) and wherein at least two of the distinct particle size peaks are attributable to (i.e., composed of) emulsion graft polymerized rubber particles.

Rubber modified styrenic polymers such as acrylonitrile/butadiene/styrene (ABS) resins and high impact polystyrene (HIPS) resins are well known in the art and in industry and find use in a wide variety of practical applications including use in computer and business equipment housings, component parts of various household appliances, trim and other parts in the automobile industry, and the like.

Also known in the art at least as a general proposition is the fact that a range of different physical and aesthetic property combinations can be imparted to such rubber modified styrenic polymer compositions by adjusting or controlling the particle size and particle size distribution of the grafted elastomeric or rubbery particles that are dispersed within, and which impart toughness and impact strength to, such polymer compositions.

Thus, for example, in Aubrey's U.S. Pat. No. 3,509,235 compositions are described having bimodal particle size distributions wherein a first, relatively large sized (0.8–2 micron number average diameter) group of grafted rubber particles constitute a minor portion (from 3–30 weight percent) of the total grafted particles and is prepared by suspension graft polymerization techniques and wherein the major proportion by weight of the grafted rubber particles are prepared by emulsion graft polymerization and have a number average particle size of from 0.01 to 0.25 micron.

ABS resin compositions having bimodal grafted rubber particle size distributions have also been disclosed wherein the relatively smaller and the relatively larger-sized grafted rubber particles contained therein are both prepared by emulsion graft polymerization techniques. In such instances, the relatively large sized (e.g., having an average diameter of 0.25 micron or more) grafted rubber particles can be obtained by separately growing the underlying rubber latex to the desired large particle size using carefully controlled emulsion polymerization conditions (and, typically, for fairly prolonged reaction times) and thereafter blending said large-sized rubber latex with the small sized rubber latex either prior or subsequent to the desired emulsion graft polymerization thereof. See, for example, Ott et al.'s U.S. Pat. No. 4,009,227 and Kawashima et al.'s U.S. Pat. No. 5,008,331. Alternatively, a relatively smaller sized rubber latex (e.g., having an average diameter of 0.05 to 0.15µ) can be agglomerated to form the large size particles (or partially agglomerated to simultaneously provide both the large and small sized particles) prior to the emulsion graft polymerization process. (See, for example, Henton et al.'s U.S. Pat. No. 4,419,496.) Typically, when the relatively large sized emulsion graft polymerized rubber particles are separately-"grown" to the desired size in their own independent emulsion polymerization step or operation, they are generally characterized as having a fairly narrow single or monomodal particle size distribution peak of their own which falls near the volume average particle size of the large particle size group taken as a whole. In contrast, when the large-sized particles are instead generated by agglomeration or partial agglomeration of smaller rubber latex particles, they typically exhibit a fairly broad or "polydisperse" particle size distribution which is spread out more or less evenly over the full size range of the individual agglomerated particles.

Known also in the art are so-called trimodal ABS compositions. Exemplary compositions of this type are described in Schmitt et al.'s U.S. Pat. No. 4,430,478 and Henton's U.S. Pat. No. 4,713,420 wherein there are disclosed trimodal ABS compositions which contain two different groups of emulsion graft polymerized rubber particles (one group having a relatively small size, e.g., averaging 0.25 micron or less and the other having an average size in excess of 0.25 micron) in combination with relatively large sized (e.g., in excess of 0.5 micron volume average) grafted rubber particles obtained by way of a mass, solution or suspension graft polymerization process.

While improvements in the overall balance of physical (e.g., impact strength, tensile strength, melt flow characteristics etc.) and aesthetic (e.g., gloss and surface appearance) properties can be obtained with the above-noted multimodal ABS compositions (i.e., relative to those of otherwise similar monomodal compositions), the general trend of further improvements in one property or characteristic such as impact strength coming only at the expense of some other property such as gloss and/or melt fluidity still prevails in the context of these various multimodal ABS resin compositions.

It would therefore be desirable to provide a means by which improvement in one or more properties within such compositions (e.g., melt fluidity and/or impact strength and/or gloss etc.) could be obtained without attendant significant sacrifices in the remaining properties of interest.

SUMMARY OF THE INVENTION

There has now been discovered a means for preparing multimodal grafted rubber particle-sized ABS resin compositions exhibiting improved impact strength and/or melt fluidity while suffering little or no sacrifice in the desirable gloss characteristics thereof.

Thus, the present invention in one of its main aspects is a process for preparing a rubber modified monovinylidene aromatic copolymer composition, said process comprising the steps of:

A. preparing or obtaining an initial aqueous elastomeric polymer emulsion containing, on a total polymer emulsion weight basis, from about 25 to about 50 weight percent of colloidally dispersed small particles of an elastomeric conjugated diene polymer having a volume averaged particle size of from about 0.15 to about 0.22 micron;

B. partially agglomerating said initial polymer emulsion to cause at least 5 but less than 50 weight percent of the dispersed small particles to agglomerate, coalesce or otherwise physically associate with each other to form enlarged colloidally dispersed polymer particles having a volume averaged particle size, determined by excluding all particles having diameters of less than 0.25 microns, of about 0.4 micron or more;

C. graft polymerizing, under emulsion polymerization conditions, the partially agglomerated polymer emulsion with a monomer mixture comprising, on a monomer mixture weight basis, from about 40 to about 90 weight percent of a monovinylidene aromatic monomer, from about 10 to about 40 weight percent of an ethylenically unsaturated nitrile monomer and from 0 to about 30 weight percent of one or more acrylate ester, methacrylate ester or N-substituted maleimide monomers to form a graft copolymer latex in which (a) the elastomeric polymer component from the initial polymer emulsion constitutes from about 40 to about 70 weight percent of the polymer solids contained therein, (b) the weight ratio of the amount of monovinylidene aromatic copolymer (G) chemically grafted to the dispersed elastomeric polymer particles to the amount of said dispersed elastomeric polymer per se (R) is from about 0.2 to about 0.4, and (c) the weight average molecular weight of the grafted and ungrafted monovinylidene aromatic copolymer formed in the graft polymerization process is in the range of from 50,000 to 130,000;

D. separating the resulting emulsion polymerized graft copolymer from its aqueous medium; and E. melt compounding the emulsion polymerized graft copolymer solids with a monovinylidene aromatic/ethylenically unsaturated nitrile copolymer or a mass, solution or suspension polymerized rubber-modified monovinylidene aromatic/ethylenically unsaturated nitrile graft copolymer; such process (and the rubber modified copolymer product prepared thereby) being further characterized in that the total population of emulsion graft copolymerized elastomeric polymer particles having a diameter of 0.25 micron or greater is increased by at least 10 weight percent on a total emulsion graft copolymerized elastomeric polymer particle basis between the completion of the step C graft polymerization and the completion of the step E melt compounding operation.

The fact that a significant portion of the relatively small grafted rubber particles (i.e., those having a particle size of less than 0.25 micron) melt agglomerate (i.e., coalesce or otherwise physically associate with one another and/or with the relatively larger particles) following the graft polymerization operation of step C is considered to be particularly surprising in light of the teachings contained at Column 1, lines 49 to 56 of Ott et al.'s aforementioned U.S. Pat. No. 4,009,227 which is to the effect that such an agglomeration phenomenon does not occur at graft to rubber (G/R) weight ratios greater than 0.2.

As used herein, the terms "elastomer" and "rubber" and the terms "elastomeric" and "rubbery" are employed interchangeably to connote a polymer material which has a second order glass transition temperature (Tg) of 0° C. or less (preferably −20° C. or less).

The terms "emulsion" and "latex" as used herein are also used interchangeably to connote a composition wherein discrete polymer particles are colloidally dispersed within a continuous aqueous medium.

The phrases "volume average" and volume averaged" as used herein connote the volume median diameter of the particular group of elastomeric polymer or grafted elastomeric polymer particles that is being referenced or characterized. Such parameter is also referred to in the art as the "$D_{50}$" diameter and specifically represents that point in the particle size distribution for the group in question wherein 50 volume ercent of the group falls at or above such size value and wherein the other 50 volume percent falls at or below such value.

In those instances wherein the grafted or ungrafted elastomeric polymer of interest is in the form of a colloidally dispersed aqueous polymer emulsion, the average particle size and the particle size distribution can be conveniently determined pursuant to known hydrodynamic chromatography (HDC) techniques.

On the other hand, when the polymer composition whose dispersed elastomeric polymer average particle size and size distribution is to be determined is in the form of a melt compounded thermoplastic room temperature solid material, such can be conveniently accomplished by way of well known Transmission Electron Micrographic (TEM) techniques.

Weight average molecular weights ($M_w$) referred to herein with respect to both grafted and ungrafted monovinylidene aromatic copolymer constituents is to be understood as having been determined by gel permeation chromatography (GPC) techniques calibrated with polystyrene standards.

DETAILED DESCRIPTION OF THE INVENTION

As has been noted above, the initial step in the process of the present invention is to either obtain (e.g., purchase) or prepare an initial aqueous emulsion of an elastomeric (i.e., rubbery) polymer in which the colloidally dispersed rubbery polymer particles contained therein are composed of an elastomeric conjugated diene polymer and have a volume average particle size of from about 0.15 to about 0.22 micron. Typically, said initial aqueous polymer emulsion will contain, on a total emulsion weight basis, from about 25 to about 50 (preferably from about 30 to about 50 and most preferably from about 30 to about 45) weight percent of the indicated colloidally dispersed rubbery polymer particles. Such initial emulsion will also typically.be characterized by a relatively narrow, monomodal particle size distribution with the individual rubber polymer particles contained therein ranging in size from a minimum of about 0.1 micron to a maximum of about 0.25 micron.

Rubbery polymers which can suitably constitute the dispersed particles within the initial aqueous emulsion include any elastomeric conjugated diene (especially 1,3-conjugated diene) homopolymer or copolymer having a second order glass transition temperature of 0° C. or less (preferably −20 C. or less) Preferred among such rubbery polymers for use herein are 1,3 conjugated diene (especially 1,3-butadiene and isoprene) homopolymers and copolymers of from about 70 to about 99 (especially from about 90 to about 97) weight percent of such 1,3 conjugated diene monomers with from 1 to about 30 (especially from 3 to about 10) weight percent of one or more monoethylenically monomers (especially monovinylidene aromatic monomers such as styrene, ethylenically unsaturated nitrile monomers such as acrylonitrile, esters of unsaturated carboxylic acids such as methyl methacrylate, ethyl acrylate, butyl acrylate, etc. and mixtures thereof).

Preferred initial aqueous elastomeric polymer emulsions for use herein are those which have a relatively narrow, monomodal particle size distribution and which have a volume average rubber particle size in the range of from 0.15 to 0.2 (especially from 0.15 to about 0.18 or 0.19) micron.

Relatively small sized aqueous rubbery polymer emulsions of the sort mentioned above, and processes for the preparation thereof, are well known in the art. See in this regard, for example U.S. Pat. Nos. 3,509,237; 3,928,494; 4,243,769 and 4,250,271. Typically, the aqueous rubbery polymer emulsions employed herein are of the sort wherein the dispersed rubbery polymer particles thereof exhibit a swelling index of from about 9 to about 25 (preferably from about 10 to about 20 and especially from about 12 to about 16) as determined from the viscosity of a dilute dispersion of swollen latex particles in tetrahydrofuran.

The second step in the process of the present invention involves partially agglomerating the above-described relatively small-sized aqueous elastomeric polymer emulsion to cause from about 5 to about 50 weight percent of the small-sized dispersed polymer particles to agglomerate, coalesce or otherwise become physically associated with each other to form enlarged elastomeric particles which are still colloidally dispersed within the surrounding continuous aqueous medium and which taken as an enlarged particle group (i.e., excluding all of the individual colloidally dispersed elastomeric particles having diameters of less than 0.25 microns) have a volume averaged particle size of at least about 0.4 micron (especially from about 0.4 to about 0.8 or 1 micron). Typically, the resulting enlarged particle group or population will be characterized by having a relatively broad (e.g., polydisperse) size distribution with the individual particles contained therein ranging in size from a minimum of about 0.25 (preferably 0.3) micron to a maximum of about 2.5 (preferably about 2) micron as determined by known hydrodynamic chromatography (HDC) techniques.

In certain instances, it is advantageous and preferred to conduct the indicated second process step in a fashion such that from about 10 or 15 to about 45 or 50 (especially from about 20 to about 40) weight percent of the initial small-sized dispersed elastomeric polymer particles are converted to the indicated enlarged particle size elastomeric polymer constituent.

Techniques suitable for use in accomplishing the desired partial agglomeration process step are well known in the art and, as a general proposition, include those which are illustrated within U.S. Pat. Nos. 3,551,370; 3,666,704; 3,956,218 and 3,825,621. An especially preferred partial agglomeration technique for use herein is the one which is taught and claimed within Henton et al.'s U.S. Pat. No. 4,419,496 and which involves the use of an agglomerating agent (Ag Ag) which is itself an aqueous polymer emulsion containing colloidally dispersed "core/shell" polymer particles in which the "core" portion thereof is elastomeric in character and the shell portion thereof is composed of a copolymer of a major proportion (e.g., from about 80 to about 99.5 weight percent) of a lower alkyl ester of an ethylenically unsaturated carboxylic acid (e.g., a $C_1$–$C_4$ alkyl acrylate or methacrylate ester) and a minor proportion (e.g., from 0.5 to about 20 weight percent) of a mono- or difunctional ethylenically unsaturated carboxylic acid (e.g., acrylic acid, methacrylic acid, maleic acid, fumaric acid, etc.).

Graft polymerization of the resulting partially agglomerated aqueous elastomeric polymer emulsion is conducted in accordance with well known emulsion graft polymerization techniques. Typically, this entails adding the desired monomer mixture with which the rubbery polymer emulsion is to be grafted to said emulsion (e.g., batchwise or on a gradual continuous addition basis) along with the desired initiators, chain transfer agents, etc. as are conventionally employed within such known emulsion graft polymerization processes.

As has been noted above, the indicated grafting monomer mixture employed herein typically comprises from about 40 to about 80 or 90 weight percent of a monovinylidene aromatic monomer in combination with from about 10 or 20 to about 40 weight percent of an ethylenically unsaturated nitrile monomer and from 0 to about 30 weight percent of one or more acrylate ester, methacrylate ester or N-substituted maleimide monomers.

Preferably, the indicated monomer mixture (and the copolymer prepared therefrom) is composed of from about 50 to about 80 or 85 (especially from about 55 or 60 to about 75 or 80) weight percent of a monovinylidene aromatic monomer; from about 15 or 20 to about 40 (especially from 15 or 20 to about 30 or 35) weight percent of an ethylenically unsaturated nitrile monomer; and from 0 to about 20 or 25 (especially from 0 up to about 10 or 15) weight percent of an acrylate or methacrylate ester monomer or an N-substituted maleimide monomer.

Exemplary of monovinylidene aromatic monomers which are suitable for use herein are styrene; alpha-alkyl monovinylidene monoaromatic compounds (e.g., alpha-methylstyrene, alpha-ethylstyrene, alpha-methylvinyltoluene, alpha-methyl dialkylstyrenes, etc.); ring-substituted alkyl styrenes (e.g., ortho-, meta-, and paravinyl toluene; o-ethylstyrene; p-ethylstyrene; 2,4-dimethylstyrene; p-tertiarybutyl styrene; etc.); ring-substituted halostyrenes (e.g., o-chlorostyrene, p-chlorostyrene, o-bromostyrene, 2,4-dichlorostyrene, etc.); ring-alkyl, ring-halosubstituted styrenes (e.g., 2-chloro-4-methylstyrene, 2,6-dichloromethylstyrene, etc.); vinyl naphthalene; vinyl anthracene, etc. The alkyl substituents generally have 1 to 4 carbon atoms and may include isopropyl and isobutyl groups. If so desired, mixtures of such monovinylidene aromatic monomers may be employed.

Exemplary ethylenically unsaturated nitrile monomers for use herein include acrylonitrile, methacrylonitrile, ethacrylonitrile, fumaronitrile, maleonitrile, etc. with acrylonitrile being especially preferred.

Acrylate and methacrylate esters suitable for use as optionally present monomers herein include methyl methacrylate, methyl acrylate, ethyl acrylate, n-butyl acrylate, 2-ethylhexyl acrylate, etc.

N-substituted maleimide monomers suitable for use herein include N-alkyl maleimides such as N-methylmaleimide, N-ethylmaleimide, N-propylmaleimide, N-isopropylmaleimide, N-t-butylmaleimide, etc.; N-cycloakylmaleimides such as N-cyclohexylmaleimide; N-arylmaleimides such as N-phenylmaleimide, N-naphthylmaleimide, etc.; and the like with N-phenyl maleimide being particularly preferred.

In conducting the indicated emulsion graft polymerization step, the amount of the aforementioned monomer mixture employed therein typically ranges from about 40 to about 150 (preferably from about 40 to about 125, more preferably from about 40 to about 110 and especially from about 40 or 50 to about 100) parts by weight per 100 parts by weight of dispersed elastomeric polymer solids contained within the partially agglomerated polymer emulsion to be graft polymerized therein. Accordingly, the initially present elastomeric polymer component of the resulting graft polymerized elastomeric polymer latex typically constitutes, from about 40 to about 70 (preferably from about 45 to about 70 and more preferably from about 50 to about 65 or 70) weight percent of the total polymer solids contained therein.

As is well known in the art, complete or perfect grafting efficiency is typically not achieved in conventional emulsion graft polymerization processes.

As a result, at least some portion of non-grafted monovinylidene aromatic/ethylenically unsaturated nitrile copolymer is inherently formed during the indicated graft polymerization process step, with the actual quantitative amount thereof that is formed therein being dependent upon a variety of factors such as for example the elastomeric polymer solids content of the starting latex, the weight ratio of grafting monomer mixture to said elastomeric polymer solids, initiator type and amount employed within the graft polymerization process, actual polymerization conditions employed, etc.

On the other hand, a substantial proportion of the monovinylidene aromatic/ethylenically unsaturated nitrile copolymer formed during the graft polymerization does become chemically combined with or attached (i.e., grafted) to the dispersed elastomeric polymer particles. In the specific case at hand, such graft polymerization process is carefully conducted to ensure that the weight ratio of grafted copolymer to rubbery or elastomeric polymer substrate, i.e., the graft to rubber or G/R ratio, is in the range of from about 0.2 to about 0.4 (especially from about 0.25 to about 0.35)

The molecular weight of the grafted and ungrafted monovinylidene aromatic/ethylenically unsaturated nitrile copolymer formed within this emulsion graft polymerization process is also considered to be an important feature within the context of the present invention. As is noted above, such grafted and ungrafted copolymer should generally have a weight average molecular weight in the range of from about 50,000 to about 130,000 for the purposes of the present invention with an especially preferred range for such purpose being from about 80,000 to about 120,000.

Following the above-described emulsion graft polymerization process step, the resulting bimodally constituted grafted elastomeric polymer particles are separated from the continuous aqueous medium in which they are colloidally dispersed. Specifically, this is done as a preparatory step prior to the melt compounding thereof with the mass, solution or suspension graft polymerized rubber modified monovinylidene aromatic/ethylenically unsaturated nitrile copolymer or the non-rubber modified monovinylidene aromatic/ethylenically unsaturated nitrile copolymer which is employed within step E of the subject process.

A variety of known techniques are available, and generally suitable, for accomplishing the requisite separation (also commonly referred to as "dewatering") step or operation. These all essentially involve destabilizing and coagulating the grafted elastomeric polymer emulsion and thereafter separating the aqueous medium from the coagulated grafted polymer particles which are no longer colloidally and stably dispersed therein.

As is well known by those skilled in this particular art area, this coagulation operation is different from, and is not to be confused with, the above-discussed partial "agglomeration" process step. In particular, the key points of distinction reside in the facts (a) that colloidal stability of the dispersed polymer particles is not destroyed in the partial agglomeration process and (b) that the agglomeration step involves treatment of the dispersed rubber particles at a stage where they have no outer protective layer of non-rubbery (i.e., rigid or relatively high melting point polymer) to prevent the massive or complete coalescence of the rubber particles which would otherwise occur upon full destabilization of the ungrafted rubber latex.

In contrast, the coagulation step does involve an essentially full and complete destabilization of the grafted rubber latex and thereby fully destroys the colloidal stability thereof. However, since this occurs after the individual dispersed rubber particles have been provided with a grafted, relatively high glass transition temperature "protective" layer, massive or complete coalescence of the individual rubber particles into a single large rubber mass as would otherwise occur upon latex destabilization is thereby prevented. In short, the outer grafted monovinylidene aromatic/ethylenically unsaturated nitrile copolymer layer which is in place at this stage on the individual dispersed rubbery polymer particles either prevents or at least greatly reduces irreversible coalescence of the individual grafted polymer particles upon latex destabilization and thereby preserves the discrete individual rubber particle character and the basic bimodal particle size distribution as was originally established in the above-described partial agglomeration process step.

Included within the various known means for suitably coagulating and dewatering the subject grafted elastomeric polymer emulsions are the so-called "chemical coagulation" methods which typically involve treatment of the emulsion with multivalent inorganic salts such as magnesium chloride, magnesium sulfate, aluminum sulfate, calcium chloride, calcium sulfate, etc. or acidic reagents such as sulfuric acid, acetic acid, phosphoric acid, etc.; so-called "mechanical finishing" which typically involves the application of heat and shear to destabilize the latex; and so-called "freeze coagulation" which involves latex destabilization via freezing the continuous aqueous medium as the means of destroying the colloidal stability of the latex in question.

Among the indicated methods, mechanical finishing and freeze coagulation (especially mechanical finishing) are preferred for use herein because they do not entail the addition of substantial amounts of chemicals or reagents and thereby result in a relatively cleaner recovered grafted rubber product having substantially better color and color stability characteristics.

The above-described dewatering operation is typically conducted solely upon the emulsion graft polymerized elastomeric polymer latex resulting directly from step C hereof. However, in some instances the monovinylidene aromatic/ethylenically unsaturated nitrile copolymer to be employed in the subsequent melt compounding operation (i.e., step E hereof) will be of a non-rubber-modified variety and will itself be initially prepared and/or acquired in the form of an aqueous emulsion thereof. In such instances, it will oftentimes be convenient and preferred to combine the grafted rubber material and the non-rubber modified copolymer in latex form (i.e., being a simple aqueous liquid pre-mixing operation) prior to the step D dewatering operation and to then simultaneously coagulate and dewater both the grafted rubber latex and the non-rubber-modified copolymer in the same dewatering operation.

The last step of the process of the present invention involves melt compounding the relatively high rubber content emulsion graft polymerized elastomeric material (sometimes referred to in the art as a "grafted rubber concentrate" or GRC") with a non-rubber-modified monovinylidene aromatic/ethylenically unsaturated nitrile copolymer and/or with a mass, solution or suspension graft polymerized rubber modified monovinylidene aromatic/ethylenically unsaturated nitrite copolymer.

Suitable non-rubber-modified monovinylidene aromatic copolymers for such melt compounding usage include those wherein monovinylidene aromatic monomers of the sort described above (preferably in major proportion by weight) and ethylenically unsaturated nitrile monomers as are also hereinbefore described (preferably in minor weight proportions) are copolymerized together either with or without minor amounts (e.g., from 1 to about 10, 15 or 20 weight percent) of various optional monomers such as, for example, acrylate or methacrylate esters, N-substituted maleimide monomers and the like. Typically, the monovinylidene aromatic monomer (especially styrene) will constitute from about 50 to about 90 (preferably from about 60 or 65 to about 80 or 85) weight percent of said non-rubber-modified polymer; the unsaturated nitrile monomer (especially acrylonitrile) will constitute from about 10 to about 50 (preferably from about 15 or 20 to about 35 or 40) weight percent thereof; and the indicated optional monomer constituents (especially N-substituted maleimides such as N-phenyl maleimide) will, if used at all, be used in amount of about 20 weight percent or less and preferably in an amount of about 15 percent or less.

Such non-rubber-modified monovinylidene aromatic copolymers can be suitably prepared for use herein by any of the well known polymerization techniques including emulsion, mass (or "bulk"), suspension or solution polymerization processes.

Especially preferred non-rubber-modified monovinylidene aromatic copolymers for use herein are those which have a weight average molecular weight of from about 70,000 to about 130,000 (most preferably from about 75,000 to about 115,000 based upon gel permeation chromatography using polystyrene standards).

Suitable mass, solution or suspension graft polymerized, rubber-modified monovinylidene aromatic copolymers for use in melt compounding with the above-described emulsion GRC materials hereof include those in which the ungrafted matrix portion and the grafted and occluded rigid polymer portions thereof generally correspond in chemical composition to the above-described non-rubber-modified copolymers and which are prepared by first dissolving a previously made rubbery polymer (typically in an amount constituting from about 5 to about 25 weight percent of the total polymerizable mixture) within the monomer mixture to be employed in preparing the desired monovinylidene aromatic copolymer. Preferably, such rubber modified monovinylidene aromatic copolymers have a weight average molecular weight in the range of from about 100,000 to about 200,000 (most preferably from about 120,000 to about 200,000).

Suitable elastomeric polymer materials for use as the rubber modifier in these mass, solution or suspension polymerized graft copolymers include diene rubbers, ethylene/propylene rubbers, ethylene/propylene/non-conjugated diene (EPDM) rubbers, acrylate rubbers, polyisoprene rubbers, halogen-containing containing rubbers and mixtures thereof as well as interpolymers of rubber-forming monomers with other copolymerizable monomers. Preferably, the rubbery polymer modifier for this particular polymer ingredient is an elastomeric conjugated diene homopolymer or copolymer of the sort which is hereinbefore described in connection with the dispersed rubbery polymer particles of the initial aqueous polymer emulsion which is employed as the initial starting material herein. Also beneficially employed for this purpose are elastomeric block copolymers of from about 60 to 80 weight percent conjugated dienes such as 1,3-butadiene and isoprene with about 20 to 40 weight percent styrene.

In one especially preferred embodiment hereof, the monovinylidene aromatic/ethylenically unsaturated nitrile copolymer portions of both the emulsion graft polymerized GRC constituent and the step E rubber modified or non-rubber-modified copolymer which is melt compounded therewith are binary styrene/acrylonitrile (SAN) copolymers which each have an acrylonitrile content in the range of from about 20 to about 40 weight percent (taken on an SAN copolymer weight basis only, i.e., excluding any rubbery polymer portion thereof for calculational purposes) and which differ from each other in terms of their respective acrylonitrile contents by no more than about 5 or 6 (preferably no more than 2.5 and most preferably less than 1.5) percentage points.

Such especially preferred compositions have been observed to exhibit notably reduced gloss sensitivity (i.e., variability in measured gloss values as a function of varied molding temperatures) than otherwise comparable compositions wherein the indicated acrylonitrile contents differ from each other by more than about 5 or 6 percentage points.

In another especially preferred embodiment, the rubber-modified or non-rubber-modified monovinylidene aromatic/ethylenically unsaturated nitrile copolymer which is compounded with the bimodal GRC component in step E hereof is one which has a minor amount (e.g., from about 2 to about 30, preferably from about 4 to about 15) weight percent of an N-substituted maleimide monomer (especially N-phenyl maleimide) polymerized therein. The presence of such additional monomer is beneficial insofar as it serves to increase the heat resistance and/or heat distortion temperature of the resulting polymer composition and to thereby enhance its suitability for use in end-use applications and/or environments involving elevated temperature exposure.

As a result of the herein-described process, there is provided a multimodal grafted rubber particle-sized rubber modified monovinylidene aromatic copolymer composition which comprises, at a minimum, at least two different groups of emulsion graft polymerized rubber particles. One of said particle groups is composed of relatively small particles which (a) individually ranges in size from about 0.1 up to less than 0.25 micron; (b) as a group exhibit a fairly narrow, sharp and well-defined particle size distribution peak at or at least near the volume average size value for the group; and (c) as a group have a volume average particle size (i.e., particle diameter) in the range of from about 0.15 to about 0.22 (preferably from about 0.15 to about 0.2) micron.

The other of said emulsion graft polymerized rubber particle groups is composed of relatively larger emulsion grafted rubber particles which (a) individually range in size from 0.25 micron up to about 2 micron or more; (b) as a group exhibit a fairly broad, polydisperse particle size distribution over the indicated 0.25 to 2 micron size range; and (c) as a group have a volume average particle size of from about 0.4 to about 1 (especially from about 0.4 to about 0.8) micron.

As has been noted briefly above, the step (B) partial latex agglomeration operation is conducted in a fashion such that from about 5 to about 50 (especially from about 20 to about 40) weight percent of the initially present small (i.e., less than 0.25 micron) rubber particles are agglomerated to form enlarged particles having sizes of 0.25 micron or greater.

Thus, at the completion of the step B partial agglomeration process, from about 50 to about 95 (more preferably from about 50 to about 80 or 85) weight percent of the colloidally dispersed rubber particles will fall in the less than 0.25 micron size range and the remaining 5 to about 50 (more preferably 15 or 20 to about 50) weight percent of said dispersed rubber particles will fall within the size range of 0.25, micron or greater.

As has also been noted briefly above, a post-step B (i.e., post-partial agglomeration) particle size growth phenomenon has been observed in connection with the practice of the present invention. In particular, it has been found that an additional 10 to about 35 or 40 (more typically from about 15 to about 25 or 30) weight percent of the initially present relatively small (i.e., less than 0.25 micron diameter) rubber particles are converted to relatively large-sized particles (i.e., greater than 0.25 micron) following the step (C) graft polymerization thereof.

Thus, for example, in those instances wherein the step B partial agglomeration step is conducted so as to agglomerate about 25 weight percent of the initially present small particles to larger size particles (i.e., of 0.25 micron and greater), the indicated further or "downstream" agglomeration or size growth phenomenon effectively results in a final emulsion graft polymerized rubber particle distribution such that at least about 35 weight percent (preferably from about 35 or 40 to about 50 or 65 weight percent) of the emulsion graft polymerized rubber particles are of a size of 0.25 micron or more in the final, melt compounded polymer composition.

In some especially preferred embodiments hereof, about 35 to 45 weight percent of the initially present small rubber particles are agglomerated to a size of 0.25 micron or more in the step B partial agglomeration process and subsequent or further "downstream" agglomeration results in more than 50 weight percent (especially from about 55 to about 65 weight percent) of the emulsion graft polymerized rubber particles falling within the above-described greater than 0.25 (e.g., from 0.25 to about 2) micron size range.

Viewed from a somewhat different perspective, the aforementioned step D and/or E further particle size growth phenomenon can be envisioned as one in which from about 10 or 15 to about 65 or 70 (more typically from about 15 or 20 to about 60 and especially from about 20 or 25 to about 50) percent of the small (i.e., less than 0.25 micron) particles which remained immediately following the step B partial agglomeration operation are converted to 0.25 micron or greater-sized particles during the subsequent dewatering and/or melt compounding operations.

In those instances wherein the above-described bimodal emulsion graft polymerized GRC material is melt compounded with a non-rubber-modified monovinylidene aromatic/ethylenically unsaturated nitrile copolymer, the resulting or final polymer composition will itself have a bimodal grafted rubber particle size distribution wherein all of the grafted rubber particles dispersed therein are of the emulsion graft polymerized variety and have a post-melt compounding particle size distribution of the sort described hereinabove.

On the other hand, when the above-described bimodal emulsion graft polymerized GRC material is melt compounded with a mass, solution or suspension graft polymerized copolymer which is itself rubber modified, the resulting final polymer composition ends up containing 2 morphologically differing groups of grafted rubber particles. One of such groups is of course, composed of the above-described bimodal particle size distribution GRC material which, as is well known in the art, is characterized by a generally solid (i.e., not significantly occluded with rigid matrix copolymer) rubber particle morphology when examined by conventional Transmission Electron Microscopy (TEM) techniques. Within such generally solid, emulsion graft polymerized group of grafted rubber particles, the small non-agglomerated portion thereof will typically be generally spherical in shape and the agglomerated relatively large-sized portion thereof will range from fully coalesced Large spherical particles to partially coalesced or partially fused together clusters of the initial small particles.

The other type or group of dispersed grafted rubber particles is that which is provided by the rubber modified mass, solution or suspension graft polymerized monovinylidene aromatic copolymer component. As is well known, this latter type of grafted rubber particles are typified by a rubber particle morphology wherein significant amounts of rigid (i.e., non-rubbery) copolymer are entrapped (i.e., "occluded") with the rubber particle itself and are visible as such via TEM analysis. This group of occluded rubber particles will typically range in size from about 0.3 micron to about 10 micron on an individual particle basis and will, taken as a group, typically have a volume average particle size in the 0.5 to about 5 (preferably from about 0.5 to about 3 or 4) micron range.

Mass, solution or suspension graft polymerized rubber-modified monovinylidene aromatic/unsaturated nitrile copolymer resins suitable for use herein will typically have rubber contents in the range of from about 5 to about 25 (preferably from about 5 to about 15 or 20) weight percent and will typically contain amounts of grafted and occluded rigid copolymer corresponding to from about 0.5 to about 3 or 4 parts by weight thereof per part by weight of the impact-modifying rubber contained therein. Accordingly, and as is normal for such rubber-modified mass, solution or suspension grafted copolymer materials, a significant amount (e.g., from about 20 or 25 up to about 85 or 90 weight percent) of such compositions can be composed of non-grafted (also referred to in the art as "free matrix") monovinylidene aromatic/ethylenically unsaturated nitrile copolymer.

Typically, the finished, melt compounded compositions hereof will have a total rubbery polymer content of from about 5 to about 30 (especially from about 10 to about 25) weight percent on a total polymer composition weight basis.

In those instances where the bimodal GRC is melt compounded with a rubber-modified mass, solution or suspension graft copolymer, the rubbery polymer portion provided by the emulsion polymerized GRC will typically constitute from about 5 to about 95 (preferably from about 10 to about 90 and more preferably from about 50 or 55 to about 75 or 85) weight percent of the total rubber content with the remainder being provided by the mass, solution or suspension graft polymerized component.

In conducting the aforementioned melt compounding operation, there will typically be combined together to form 100 parts by weight of the finished multimodal rubber modified polymer composition (a) from about 10 to about 75 (preferably from about 15 to about 60) parts by weight of the dewatered bimodal GRC component (i.e., from step D of the subject process) and (b) from about 25 to about 90 (especially from about 40 to about 85) parts by weight of the aforementioned non-rubber-modified monovinylidene aromatic/ethylenically unsaturated nitrile copolymer and/or the rubber-modified mass, solution or suspension graft polymerized monovinylidene aromatic/ethylenically unsaturated nitrile copolymer component.

Naturally, any and all desired types of conventional additive materials such as U.V. stabilizers, lubricants, fillers, dyes, pigments, antioxidants, etc. can also be conveniently incorporated within the subject multimodal rubber particle-size polymer compositions in their normally employed quantitative proportions in conjunction with the aforementioned melt compounding operations.

The present invention is further understood and illustrated by reference to the following exemplary embodiments in which all parts and percentages are presented on a weight basis unless otherwise specifically indicated.

EXAMPLES 1 AND 2

In these examples, three different emulsion graft polymerized grafted rubber concentrates (i.e., Examples 1 and 2 and Comparative Example A) are prepared using 3 different initial 1,3-butadiene/styrene/acrylonitrile (92-93/5-6/1-3 weight ratio) copolymer rubber latexes (having differing volume averaged particle sizes for the colloidally dispersed rubber particles contained therein) as the initial starting materials.

Each of said latexes are initially characterized (i.e., in their original form) as having relatively narrow, monomodal rubber particle size distributions in which the peak in the size distribution falls at or near the volume average particle size indicated in Table I below for the individual rubber latex in question.

Each of said latexes are partially agglomerated using a core/shell (elastomeric 1,3-butadiene/styrene copolymer core and ethyl acrylate/methacrylic acid copolymer shell) agglomerating agent latex (as per Henton et al.'s U.S. Pat. No. 4,419,496) to cause about 20 to 40 weight percent of the initially present relatively small (i.e., less than 0.25 micron in diameter) dispersed rubber particles to agglomerate with each other to form enlarged rubber particles having individual particle sizes in excess of 0.25 micron (i.e., between 0.25 micron and 2 micron) as determined by hydrodynamic chromatography analysis.

The resulting partially agglomerated rubber latexes are then graft polymerized with a 77/23 weight ratio styrene/acrylonitrile (SAN) monomer mixture to form bimodal rubber particle-sized grafted rubber concentrate latexes having rubber contents in the range of 54–65 percent (solids weight basis); grafted SAN copolymer:rubber (G/R) ratios in the range of from 0.26 to 0.33; and SAN copolymer weight average molecular weights (mw) in 88,000 to 99,000 range as measured by gel permeation chromatography using polystyrene standards.

These bimodal GRC latexes are then dewatered and recovered in solid form by freeze-coagulation and centrifugation, or by mechanical isolation as per Pingle's U.S. Pat. No. 4,299,952, and are melt compounded on a Welding Engineers counterrotating twin screw extruder with a 79/21 weight ratio SAN copolymer resin (weight average molecular weight=99,000) to form three different finished bimodally particle-sized ABS resins each having rubber contents of 19 weight percent (on a finished ABS resin weight basis).

During said dewatering and melt compounding operations, further agglomeration of the small (i.e., less than 0.25 micron) grafted rubber particles occurs with the result that following melt compounding greater than 50 weight percent of the grafted rubber particles have sizes (as determined by electron microscopy) in excess of 0.25 micron.

The characteristics and properties of the resulting bimodal rubber particle size ABS resins are set forth in Table 1 below.

TABLE I

| Characteristic/Property | Example 1 | Example 2 | Comparative Example A |
|---|---|---|---|
| Initial Rubber Latex Size (micron) | 0.161 | 0.169 | 0.124 |
| Post-Agglomeration Rubber Particle Size Distribution | | | |
| Less than 0.25 micron (%)* | 55–70 | 55–70 | 65–80 |
| From 0.25 to 2 micron (%)* | 30–45 | 30–45 | 20–35 |
| Final (Post-Melt Compounding) Size Distribution | | | |
| Less than 0.25 micron (%)* | 35–45 | 35–45 | 55–65 |
| From 0.25 to 2 micron (%)* | 55–65 | 55–65 | 35–45 |
| Graft to Rubber (G/R) Ratio | 0.29 | 0.33 | 0.26 |
| Rubber Content of Grafted Rubber Concentrate (%) | 64 | 63 | 65 |
| Percent AN in Grafted SAN | 23.6 | 23.6 | 23.1 |
| $M_w$ of Grafted SAN | 88,000 | 99,000 | 89,000 |
| Percent AN in Melt Compounded SAN Resin | 21 | 21 | 21 |
| $M_w$ of Melt Compounded SAN Resin | 99,000 | 99,000 | 99,000 |
| Properties of Final ABS Resin | | | |
| Rubber Content of Final ABS Resin (%) | 19 | 19 | 19 |
| 600 Gardner Gloss | 93 | N.D. | 95 |
| Melt Flow Rate[1] (MFR, grams/10 min.) | 8.1 | 9.8 | 7.4 |
| Izod Impact Strength[2] (ft lbs/inch) | 3.9 | 3.95 | 4.0 |

1. ASTM D1238, Condition I
2. ASTM D256
*Estimated Values
N.D. = Not Determined

As can be seen from the results in Table I, the ABS resins prepared in accordance with the present invention have notably better melt flow rate values than the Comparative Resin without any significant attendant sacrifice in the gloss and impact properties thereof.

EXAMPLE 3

In this example, the procedures of Examples 1 and 2 are essentially repeated to prepare two additional ABS resins. The first one, Example 3, is in accordance with the present invention and has a starting point rubber latex particle size in excess of 0.15 micron (specifically 0.177 micron) and is, following partial agglomeration, grafted with a 78/22 weight ratio SAN copolymer ($M_w$=89,000) to a G/R value of less than 0.4 (specifically 0.24). The second one is a comparative experiment, Comparative Example B, wherein the starting point rubber latex particle size is 0.124 micron and wherein it is grafted (following partial agglomeration) with a 69.3/30.7 weight ratio SAN copolymer ($M_w$=123,000) to a G/R ratio of about 0.6.

The specific characteristics and properties of the resulting ABS resins are set forth in Table II below.

EXAMPLE 4

In another set of experiments, one ABS resin (i.e., Example 4) is prepared which is very similar to that of Example 3 with the exception of (a) its initial rubber latex particle size being 0.159 micron; (b) its grafted SAN Mw being 103,000; (c) its graft to rubber ratio being 0.3; (d) its grafted SAN containing 30.5 percent AN and (e) its overall rubber content being 22 weight percent. The other ABS resin (Comparative Example C) is essentially the same as Comparative Example B except for having a grafted SAN acrylonitrile content of 28 percent; a grafted SAN $M_w$ of 124,000 and a total rubber content of 22 weight percent.

The specific characteristics and properties of these latter two resins are also set forth in Table II below.

TABLE II

| Characteristic/ Property | Example 3 | Comparative Example B | Example 4 | Comparative Example C |
|---|---|---|---|---|
| Initial Rubber Latex Size (micron) | 0.177 | 0.124 | 0.159 | 0.124 |
| Post-Agglomeration Rubber Particle Size Distribution | | | | |
| Less than 0.25 micron (%) | 55–70* | 65–80* | 55–70* | 65–80* |
| From 0.25 to 2 micron (%) | 30–45* | 20–35* | 30–45* | 20–35* |
| Final (Post-Melt Compounding) Size Distribution | | | | |
| Less than 0.25 micron (%) | 44 | 59 | 35–45* | 55–60* |
| From 0.25 to 2 micron (%) | 56 | 41 | 55–65* | 40–45* |
| Graft/Rubber (G/R) Ratio | 0.24 | 0.6 | 0.3 | 0.5 |
| Rubber Content of Grafted Rubber Concentrate (%) | 59 | 51 | 54 | 51 |
| Percent AN in Grafted SAN | 22 | 30 | 30.5 | 28 |
| $M_w$ of Grafted SAN | 89,000 | 123,000 | 103,000 | 124,000 |
| Percent AN in Melt Compounded SAN Resin | 31 | 31 | 31 | 31 |
| $M_w$ of Melt Compounded SAN Resin | 91,000 | 91,000 | 91,000 | 91,000 |
| Properties of Final ABS Resin | | | | |
| Rubber Content of Final ABS Resin (%) | 19 | 19 | 22 | 22 |
| 60° Gardner Gloss | N.D. | 98 | 97 | 95 |
| Melt Flow Rate[1] (MFR, grams/10 min.) | 5.5 | 5.2 | 5.0 | 1.9 |
| Izod Impact Strength[2] (ft lbs/inch) | 6.0 | 4.0 | 8.3 | 6.8 |

1. ASTM D1238, Condition I
2. ASTM D256
*Estimated Values
N.D. = Not Determined

EXAMPLES 5 and 6

In these examples, the procedures of Examples 1 and 2 are essentially repeated to prepare two different bimodal particle sized ABS resins both of which are in accordance with the present invention but which are grafted to two different G/R ratios (i.e., 0.28 and 0.4, respectively).

The properties and characteristics of the resulting ABS resins are set forth in Table III below. As can be seen from the data in Table III, both materials have large particle (0.25–2 micron) populations of less than 50 weight percent following step B partial agglomeration but then exhibit large particle populations in excess of 50 weight percent after melt compounding into the finished ABS resin.

TABLE III

| Characteristic/Property | Example 5 | Example 6 |
|---|---|---|
| Initial Rubber Latex Size (micron) | 0.172 | 0.172 |
| Post-Agglomeration Rubber Particle Size Distribution | | |
| Less than 0.25 micron (%) | 56 | 63 |
| From 0.25 to 2 micron (%) | 44 | 37 |
| Final (Post-Melt Compounding) Size Distribution | | |
| Less than 0.25 micron (%) | 41 | 41 |
| From 0.25 to 2 micron (%) | 59 | 59 |
| Graft to Rubber (G/R) Ratio | 0.28 | 0.4 |
| Rubber Content of Grafted Rubber Concentrate (%) | 54 | 54 |
| Percent AN in Grafted SAN | 31 | 31 |
| $M_w$ of Grafted SAN | 98,000 | 108,000 |
| Percent AN in Melt Compounded SAN Resin | 31 | 31 |
| $M_w$ of Melt Compounded SAN Resin | 91,000 | 91,000 |
| Properties of Final ABS Resin | | |
| Rubber Content of Final ABS Resin (%) | 16 | 16 |
| 60° Gardner Gloss | 94 | 93 |
| Melt Flow Rate[1] (MFR, grams/10 min.) | 8.7 | 9.7 |
| Izod Impact Strength[2] (ft lbs/inch) | 6.3 | 4.9 |

1. ASTM D1238 Condition I
2. ASTM D256

EXAMPLES 7–9

In this series of examples, the procedure of Examples 1 and 2 are again substantially repeated to prepare three different bimodal rubber particle-sized ABS resins which are all in accordance with the present invention but which having different degrees of "mis-matching" as between the AN content of their respective grafted SAN and melt compounded SAN constituents. The properties and characteristics of the resulting ABS resins are summarized in Table IV below.

As can be seen from the data in Table IV, the resins (i.e., Examples 8 and 9) wherein the acrylonitrile contents of the grafted SAN and the melt compounded SAN are within about 5 percentage points of each other exhibit substantially less gloss sensitivity as a function of test specimen molding temperature.

TABLE IV

| Characteristic/Property | Example 7 | Example 8 | Example 9 | Comparative Example D |
|---|---|---|---|---|
| Initial Rubber Latex Size (micron) | 0.188 | 0.152 | 0.159 | 0.124 |
| Post-Agglomeration Rubber Particle Size Distribution | | | | |
| Less than 0.25 micron (%)* | 55–70 | 55–70 | 55–70 | 65–80 |
| From 0.25 to 2 micron (%)* | 30–45 | 30–45 | 30–45 | 20–35 |
| Final (Post-Melt Compounding) Size Distribution | | | | |
| Less than 0.25 micron (%)* | 35–45 | 35–45 | 35–45 | 55–60 |
| From 0.25 to 2 micron (%)* | 55–65 | 55–65 | 55–65 | 40–45 |

TABLE IV-continued

| Characteristic/Property | Example 7 | Example 8 | Example 9 | Comparative Example D |
|---|---|---|---|---|
| Graft to Rubber (G/R) Ratio | 0.27 | 0.28 | 0.3 | 0.5 |
| Rubber Content of Grafted Rubber Concentrate (%) | 62 | 54 | 54 | 51 |
| Percent AN in Grafted SAN | 23.4 | 25.7 | 30.5 | 28 |
| $M_w$ of Grafted SAN | 108,000 | 95,000 | 103,000 | 124,000 |
| Percent AN in Melt Compounded SAN Resin | 31 | 31 | 31 | 31 |
| $M_w$ of Melt Compounded SAN Resin | 91,000 | 91,000 | 91,000 | 91,000 |
| Difference Between Graft AN and Matrix AN Content | 7.6% | 5.3% | 0.5% | 3% |
| Properties of Final ABS Resin | | | | |
| Rubber Content of Final ABS Resin (%) | 17 | 16.6 | 16.5 | 16 |
| 60° Gardner Gloss of Test Specimens Molded at 232° C. | 100 | 100 | 99 | 95 |
| 60° Gardner Gloss of Test Specimens Molded at 288° C. | 61 | 91 | 93 | N.D. |
| Melt Flow Rate[1] (MFR, grams/10 min.) | 8.9 | 9.9 | 9.5 | 5.8 |
| Izod Impact Strength[2] (ft lbs/inch) | 6.5 | 5.6 | 5.1 | 3.9 |

1. ASTM D1238, Condition I
2. ASTM D256
*Estimated Values
N.D. = Not Determined

While the present invention has been described and illustrated by reference to certain specific embodiments and examples thereof, such is not to be understood or interpreted as in any way limiting the scope of the instantly claimed invention.

What is claimed is:

1. A process for preparing a rubber modified monovinylidene aromatic copolymer composition, said process consisting essentially of the steps of:

A. preparing or obtaining an initial aqueous elastomeric polymer emulsion containing, on a total polymer emulsion weight basis, from about 25 to about 50 weight percent of colloidally dispersed small particles of an elastomeric conjugated diene polymer having a volume averaged particle size of from about 0.15 to about 0.22 micron;

B. partially agglomerating said initial polymer emulsion to cause at least 5 but less than 50 weight percent of the dispersed small particles to agglomerate, coalesce or otherwise physically associate with each other to form enlarged colloidally dispersed polymer particles having a volume averaged particle size, determined by excluding all particles having diameters of less than 0.25 microns, of about 0.4 micron or more;

C. graft polymerizing, under emulsion polymerization conditions, the partially agglomerated polymer emulsion with a monomer mixture consisting of, on a monomer mixture weight basis, from about 40 to about 90 weight percent of a monovinylidene aromatic monomer, from about 10 to about 40 weight percent of an ethylenically unsaturated nitrile monomer and from 0 to about 30 weight percent of one or more acrylate ester or methacrylate ester monomers to form a graft copolymer latex in which (a) the elastomeric polymer component from the initial polymer emulsion constitutes from about 40 to about 70 weight percent of the polymer solids contained therein, (b) the weight ratio of the amount of aromatic copolymer (G) chemically grafted to the dispersed elastomeric polymer particles to the amount of said dispersed elastomeric polymer per se (R) is from about 0.2 to about 0.4, and (c) the weight average molecular weight of the grafted and ungrafted monovinylidene aromatic copolymer formed in the graft polymerization process is in the range of from 50,000 to 130,000;

D. separating the resulting emulsion polymerized graft copolymer from its aqueous medium; and E. melt compounding the emulsion polymerized graft copolymer solids with a monovinylidene aromatic/ethylenically unsaturated nitrile copolymer or a mass, solution or suspension polymerized rubbermodified monovinylidene aromatic/ethylenically unsaturated nitrite graft copolymer; such process being further characterized in that the total population of emulsion graft copolymerized elastomeric polymer particles having a volume median diameter of 0.25 micron or greater is increased by at least 10 weight percent on a total emulsion grafted copolymerized elastomeric polymer particle basis between the completion of the step C graft polymerization and completion of the step E melt compounding operation.

2. The process of claim 1 wherein the monovinylidene aromatic/ethylenically unsaturated nitrite copolymer, or the ungrafted matrix portion of the mass, solution or suspension polymerized rubber-modified monovinylidene aromatic/ethylenically unsaturated nitrite graft copolymer employed in step E has a weight average molecular weight of from about 70,000 to about 200,000.

3. The process of claim 2 wherein the monovinylidene aromatic monomer component of the emulsion graft polymerized copolymer latex of step C and of the monovinylidene aromatic/ethylenically unsaturated nitrite copolymer or mass, solution or suspension polymerized graft copolymer of step E comprises styrene and wherein the ethylenically unsaturated nitrite monomer component of both of said copolymers comprises acrylonitrile.

4. The process of claim 1 wherein the monovinylidene aromatic/ethylenically unsaturated nitrile copolymer portion of the step C graft copolymer latex is a binary styrene/acrylonitrile (SAN) copolymer which has an acrylonitrile content (X) in the range of from 20 to about 40 weight percent; the monovinylidene aromatic/ethylenically unsaturated nitrite copolymer or the monovinylidene aromatic/ethylenically unsaturated nitrite copolymer portion of the mass, solution or suspension polymerized rubber modified graft copolymer employed in step E is a binary styrene/acrylonitrile (SAN) copolymer which has an acrylonitrile content (Y) in the range of from about 20 to about 40 weight percent; and the numerical difference between X and Y is about 6 percent or less.

5. The process of claim 3 wherein the monovinylidene aromatic/ethylenically unsaturated nitrile copolymer employed in step E is a non-rubber-modified copolymer of styrene and acrylonitrile and has weight average molecular weight of from about 70,000 to about 130,000.

6. The process of claim 3 wherein the monovinylidene aromatic/ethylenically unsaturated nitrile copolymer employed in step E comprises a mass, solution or suspension polymerized rubber-modified styrene/acrylonitrile graft copolymer in which the ungrafted styrene/acrylonitrile copolymer portion thereof has a weight average molecular weight of from about 100,000 to about 200,000.

7. The process of claim 3 wherein the monovinylidene aromatic/ethylenically unsaturated nitrile copolymer employed in step E comprises a graft polymer prepared by graft polymerizing a monomer mixture comprising styrene and acrylonitrile employed in step C under mass, solution or suspension polymerization conditions onto a 1,3 conjugated diene homopolymer or copolymer rubber.

8. The process of claim 1 wherein the emulsion graft copolymerized copolymer latex of step "C" has an elastomeric polymer component content of from about 45 to about 70 weight percent and has graft copolymer to elastomeric polymer weight ratio (G:R ratio) of from about 0.25 to 0.35.

9. The process of claim 1 wherein total population of emulsion graft copolymerized elastomeric copolymer particles having a diameter of 0.25 micron or greater is increased by at least 25 weight percent on a total emulsion graft copolymerized elastomeric particle basis during the separation and melt compounding operations of steps D and E.

10. The process of claim 4 wherein the numerical values of X and Y differ from each other by 2.5 percentage points of less.

11. The process of claim 4 wherein the numerical values of X and Y differ from each other by less than 1.5 percentage points.

* * * * *